(12) United States Patent
Takeuchi et al.

(10) Patent No.: US 7,075,740 B2
(45) Date of Patent: Jul. 11, 2006

(54) PRISM AND METHOD FOR PRODUCING THE SAME

(75) Inventors: Hirokazu Takeuchi, Otsu (JP); Nagaharu Nakajima, Otsu (JP); Tadashi Seto, Otsu (JP); Mitsutaka Nakae, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 0 days.

(21) Appl. No.: 10/507,086

(22) PCT Filed: Mar. 5, 2003

(86) PCT No.: PCT/JP03/02530

§ 371 (c)(1),
(2), (4) Date: Jan. 24, 2005

(87) PCT Pub. No.: WO03/076983

PCT Pub. Date: Sep. 18, 2003

(65) Prior Publication Data

US 2005/0122601 A1 Jun. 9, 2005

(30) Foreign Application Priority Data

Mar. 8, 2002 (JP) .............................. 2002-063571

(51) Int. Cl.
*G02B 5/04* (2006.01)

(52) U.S. Cl. ..................................... 359/831; 359/834
(58) Field of Classification Search ............... None
See application file for complete search history.

(56) References Cited

U.S. PATENT DOCUMENTS 5,080,706 A * 1/1992 Snyder et al. ................. 65/102
6,511,190 B1 * 1/2003 Ohgane ...................... 359/856

* cited by examiner

*Primary Examiner*—Euncha P. Cherry
(74) *Attorney, Agent, or Firm*—J.C. Patents

(57) ABSTRACT

A prism is produced by the steps of feeding a glass base material into a heating furnace, the glass base material having surfaces to be prism surfaces after forming, the Ra value of the surface roughness of the surface being less than the Ra value corresponding to #170, the glass base material having a predetermined dimensional ratio, grasping the glass base material with feeding means, and feeding the glass base material into a heating furnace to heat the glass base material to a temperature so that a minimum viscosity of the glass base material becomes equal to or more than $10^4$ Pa·s and less than $10^6$ Pa·s, drawing and forming the lower portion of the glass base material, and then cutting the glass base material to obtain a longer body having a desired dimension and prism surfaces with the Ra value of the surface roughness equal to or less than a quarter of the wavelength of incident light, and cutting the longer body into desired length.

9 Claims, 2 Drawing Sheets

PRISM AND METHOD FOR PRODUCING THE SAME

BACKGROUND OF THE INVENTION

The present invention relates to a glass prism and a method for producing the prism.

Recently, according to development in the technology of optical recording and optical communication, various types of small-sized prisms, which have the advantages for optical signal processing, such as transparency, low expansion rate, mass productivity, proper polish-ability and the like are used as an optical head of an optical disk device, an optical switch of the optical communication, or the like.

There are prisms in which light incident from the first surface is totally reflected by the second surface and exits from the third surface, light incident from the first surface is totally reflected by the second surface and then by third surface and exits from the first surface, and the like. To make correct use of the function of operating an optical signal like this, it is necessary that prism surfaces such as the first to third surfaces and the like which are subjected to the optical signal, are precisely formed at proper angles therebetween, and are mirror finished surfaces with high surface accuracy.

To satisfy the foregoing requirements, the glass prism is generally produced by the steps of preparing a glass flank approximately in the shape of a prism which is roughly formed with a processing margin, and carrying out polish finish after precisely grinding the prism surfaces one by one, in order to make the surfaces into the mirror finished surfaces having high angular accuracy (accuracy in angles between the prism surfaces) and high surface accuracy.

Recently, in accordance with increase in capacity of the optical recording and in speed and capacity of the optical communication, such an optical head for the optical disk device, an optical switch of the optical communication, and the like for their use grow in demand. Accordingly, an inexpensive resin prism is widely used, but there may be cases in which the resin prism cannot be used because of the reliability such as the temperature dependency of optical characteristics, moisture resistance, and the like.

When the foregoing conventional producing method is adopted to produce the objective glass prism, it is necessary to form the prism surfaces so as to have required high angular accuracy therebetween, surface roughness and flatness by carrying out the polish finish after precisely grinding the prism surfaces one by one. Therefore, many complicated producing processes are necessary, so that a cost rise due to low producing yield may become a problem.

In a case of producing a small-sized prism the cross sections of which, perpendicular to prism surfaces, are less than 100 mm$^2$, or producing an elongate prism which satisfies the relation of $L \geq 1.5D/2^{0.5}$, where D represents the diameter of a circumscribed circle of the cross section perpendicular to prism surfaces, and L represents the length of the prism in a direction parallel to the prism surfaces, the glass blank is hard to handle. Thus, there are problems that the glass blank is susceptible to damage during operation such as polishing, that it is difficult to form the prism surfaces with required high angular accuracy therebetween, and that it is difficult to form the prism surfaces into the mirror finished surfaces having uniform surface accuracy. There is even a case where the prism surfaces completed with much effort are damaged during processing or cleaning after processing. Furthermore, if a corner portion adjacent to the prism surfaces cracks during a polishing process or the like, resistance to breakage decreases, so that the blank is often damaged especially in the elongate prism and the yield is lowered. Low yield decreases efficiency in manufacturing, so that the conventional producing method of the glass prism is unsuitable for mass production.

In order to address the foregoing problems, Japanese Patent Laid-Open Publication No. Hei10-1321 has proposed a method wherein drawing a round glass bar to obtain a rod-shaped glass blank, reheating anti press-forming the glass blank into a polyhedral longer body to take out many prisms each having a predetermined length. According to this method, however, it is difficult to control a forming die determining the quality of the prism surfaces, so that there is a problem that the manufacturing cost will be less reduced when the forming die has a short life.

SUMMARY OF THE INVENTION

An object of the present invention is to solve the above problems, thereby to provide a small-sized glass prism having high accuracy and strength which is useable for high-capacity optical recording and high-speed and high-capacity optical communication, and to provide a producing method for the prism which is suitable for mass production with high producing efficiency.

To achieve the above object, a prism according to the present invention is made of a transparent glass, and comprises prism surfaces subjected to light and corner portions adjacent to the prism surfaces, wherein surfaces of the corner portions are fire-polished surfaces, and wherein a compressive stress layer having stress of 0.1 to 10 MPa is formed on the surface of the corner portion.

The corner portion adjacent to the prism surfaces subjected to light such as an optical signal, is a line-like portion between the surface through which the incident light transmits and the surface on which the incident light which has been transmitted is reflected. In the prism according to the present invention, the corner portions are rounded in cross section by heating, drawing and forming, and the surface thereof is the so-called fire-polished surface formed by hot working. The fire-polished surface possesses strength almost as high as the strength of glass itself, because the fire-polished surface does not substantially have defect such as a surface crack.

When the stress of the compressive stress layer formed in the surface of the corner portion is less than 0.1 MPa, the corner portion maybe not enough strengthened, and possesses lower strength. When the stress of the compressive stress layer exceeds 10 MPa, on the other hand, optical characteristics such as refractive index are adversely affected, and further surroundings are adversely affected by scattered glass in braking the prism during handling. It is important that the stress of the compressive stress layer formed in the surface of the corner portion is 0.1 to 10 MPa.

In the above structure, it is preferable that a sectional area perpendicular to the prism surfaces is equal to or less than 100 mm$^2$.

"The sectional area perpendicular to the prism surfaces is equal to or less than 100 mm$^2$" means, in a case of a right-angle prism, that the prism is small in size in which a section in the shape of a right-angled triangle, a right-angled isosceles triangle or the like has an area equal to or less than 100 mm$^2$.

In the above structure, it is preferable that the prism satisfies a relation of $L \geq 1.5D/2^{0.5}$, where D represents a diameter of a circumscribed circle of a section perpendicular to the prism surfaces, and L represents a length of the prism in a direction parallel to the prism surfaces.

In a case of a right-angle prism, for instance, the diameter D of the circumscribed circle refers to the diameter of a circumscribed circle which is circumscribed about a section in the shape of a right-angled triangle, a right-angled isosceles triangle or the like. When the prism satisfies the relation of $L \geq 1.5D/2^{0.5}$, the prism is elongate so that the length L is more than 1.06 times as long as the diameter D of the circumscribed circle.

In the above structure, it is preferable that an optical film is formed on the prism surface.

As for the optical film formed on the prism surface, a filter film, a polarizing film such as a beam splitter film, an anti-reflective film, a neutral-density filter film, a metal mirror film, a combination film of the foregoing films, and the like are available.

To achieve the above objects, the present invention provides a method for producing a prism, comprising the steps of, preparing a glass base material made of transparent glass, the glass bases material having surfaces to be prism surface after forming, the Ra value of the surface roughness of the surface being less than the Ra value corresponding to #170, the glass base material having a dimensional ratio in a predetermined range with respect to the prism obtained after forming, grasping the glass base material with a grasp portion of feeding means, and feeding the glass base material into a heating furnace to heat the glass base material to a predetermined temperature so that a minimum viscosity of the glass base material becomes equal to or more than $10^4$ Pa·s and less than $10^6$ Pa·s, drawing and forming a lower portion of the glass base material by drawing means, and then cutting the glass base material into a predetermined length to obtain a longer body having a substantially similar shape to that of the glass base material and a dimension in a desired range, and having prism surfaces with the Ra value of the surface roughness equal to or less than a quarter of the wavelength of incident light, and cutting the longer body into desired length.

When the Ra value of the surface roughness of the surface of the glass base material, to be the prism surface after forming, is rougher than the Ra value corresponding to #170, it is hardly to obtain the longer body in which the Ra value of the surface roughness of the prism surface is equal to or less than a quarter of the wavelength of incident light. It is important that the surface roughness of the surface, to be the prism surface after forming, of the glass base material used in the present invention is smoother than the surface roughness corresponding to #170. Taking a case of borosilicate optical glass, for example, the Ra value of the surface roughness corresponding to #170 is 1 to 3 µm, and is approximately 2 µm in most cases.

When the minimum viscosity of the glass base material in the heating furnace is less than $10^4$ Pa·s, the glass base material sags while being drawing and forming. This makes it difficult to draw the longer body with a predetermined length straight, so that the longer body becomes to be bended. In addition, the longer body obtained by drawing and forming is largely deforms due to surface tension, so that the share of the longer body becomes dissimilar to that of the glass base material. When the minimum viscosity is equal to or more than $10^6$ Pa·s, on the other hand, the great force of drawing is necessary to increase drawing speed due to the rheologic behavior of a glass under drawing and forming, so that it becomes difficult to manufacture corresponding forming equipment, and tensile stress under drawing and forming causes a lot of breakage in the glass base material. In other words, when the minimum viscosity is equal to or more than $10^6$ Pa·s, since the drawing speed cannot be higher, forming is carried out at extremely low speed. In the present invention, it is important that the minimum viscosity of the glass base material in the heating furnace is equal to or more than $10^4$ Pa·s and less than $10^6$ Pa·s.

Furthermore, when the Ra value of the surface roughness of the prism surfaces of the longer body exceeds a quarter of the wavelength of incident light, light is irregularly reflected, so that the prism cannot be used for high-capacity optical recording and high-speed and high-capacity optical communication. It is important that the longer body, obtained by drawing and forming in the present invention, has prism surfaces having the Ra value of the surface roughness equal to or less than a quarter of the wavelength of incident light.

The prism surfaces of the longer body obtained by drawing and forming may be finished with polishing.

When polishing the prism surfaces of the longer body, obtained by drawing and forming, slightly polishing the adjacent prism surfaces is possible to finish the adjacent prism surfaces with higher precision in angular accuracy, surface roughness, and flatness.

According to the prism of the present invention made of transparent glass, the surface of the corner portion adjacent to the prism surfaces subjected to light is a fire-polished surface, and a compressive stress layer having a stress of 0.1 to 10 MPa is formed in the surface of the corner portion, so that the corner portion, which tends to become chipped, is physically strengthened. Thus, since the glass prism is impervious to being damaged, and any broken piece of glass hardly occurs, the prism surface is impervious to be scratched, and hence the prism is easily handled.

According to the prism or the present invention, since a sectional area perpendicular to the prism surfaces is equal to or less than 100 mm$^2$, it is possible to provide a small-sized prism in which the corner portions are strengthened.

According to the prism of the present invention, the prism satisfies the relation of $L > 1.5D/2^{0.5}$, wherein D represents the diameter of a circumscribed circle of a section perpendicular to the prism surfaces, and L represents the length of the prism in a direction parallel to the prism surfaces. Therefore, it is possible to provide an elongate prism in which the corner portions are strengthened and hard to break.

According to the prism of the present invention, an optical film is formed on the prism surface. By forming a filter film, a polarizing film such as a beam splitter film, an anti-reflective film, a neutral-density filter film, a metal mirror film, a combination film of the foregoing films, and the like, it is possible to provide various types of prisms which have strengthened corner portions and are available for the high-capacity optical recording and high-speed and high-capacity optical communication.

According to the present invention, the method for producing a prism comprises the steps of, preparing a glass base material made of transparent glass, the glass base material having surfaces to be prism surface after forming, the Ra value of the surface roughness of the surface being less than the Ra value corresponding to #170, the glass base material having a dimensional ratio in a predetermined range with respect to the prism obtained after forming, grasping the glass base material with a grasp portion of feeding means, and feeding the glass base material into a heating furnace to heat the glass base material to a predetermined temperature so that a minimum viscosity of the glass base material becomes equal to or more than $10^4$ Pa·s ad less than $10^6$ Pa·s, drawing and forming a lower portion of the glass base material by drawing means, and then cutting the glass base material into a predetermined length to obtain a longer body having a substantially similar shape to that of the glass base material and a dimension in a desired range, and having prism surfaces with the Ra value of the surface roughness equal to or less than a quarter of the wavelength of incident light, and cutting the longer body into desired length. Therefore, it is possible to efficiently produce a prism that has strengthened corner portions, so as to be available for the high-capacity optical recording find high-speed and high-capacity optical communication.

According to the method for producing a prism of the present invention, the prism surfaces of the longer body, obtained by drawing and forming, are polished. The longer body, obtained by drawing and forming, has a dimension in a desired range and the prism surfaces the Ra value of the surface roughness of which are less than a quarter of the wavelength of incident light. Therefore, it is possible to finish the adjacent prism surfaces with-higher precision in angular accuracy, surface roughness, and flatness by slightly polishing the adjacent prism surfaces of the longer body. In addition, slightly polishing operation of the prism surfaces of the longer body is carried out in a short time. Also, polishing the longer body increases the efficiency of polishing per prism.

As described above, according to the prism and the method for producing the prism of the present invention, since many prisms with high precision can be obtained from a single glass base material, and the prisms possess high strength, it is possible to produce many high-reliability prisms in a short time and at low cost. Therefore, an optical device using the prism is efficiently produced at low cost, so that beneficial effect is obtained.

BRIEF DESCRIPTION OF THE DRAWINGS

FIG. 1(A) includes a perspective view and a partly enlarged perspective view of a right-angle prism in the shape of a right-angled isosceles triangle, FIG. 1(B) is a perspective view of the right-angle prism on which a filter film is formed, and FIG. 1(C) is a perspective view of the right-angle prisms which are disposed oppositely to each other across a polarizing film having the function of a beam splitter.

FIG. 2 includes explanatory views of a producing method for the prism according to the present invention.

DETAILED DESCRIPTION OF THE INVENTION

First, a prism according to the present invention will be described.

Figure 1:
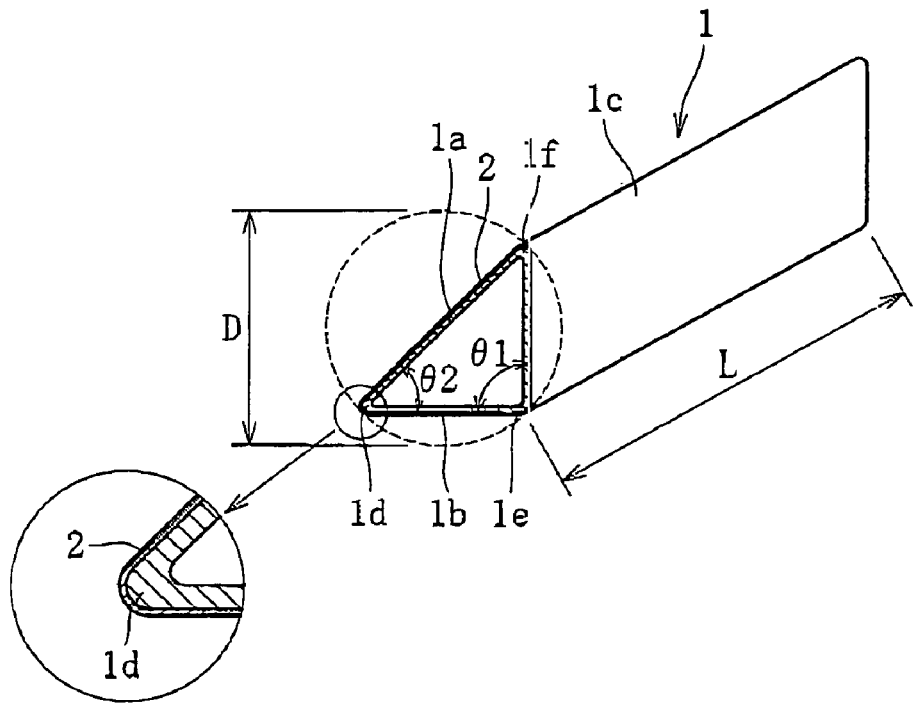
FIG. 1 includes explanatory views of a prism according to the present invention.
Figure 1:
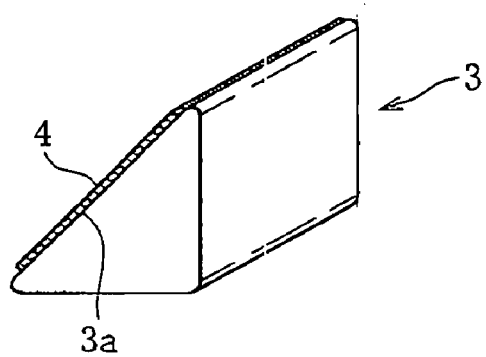
Figure 1:
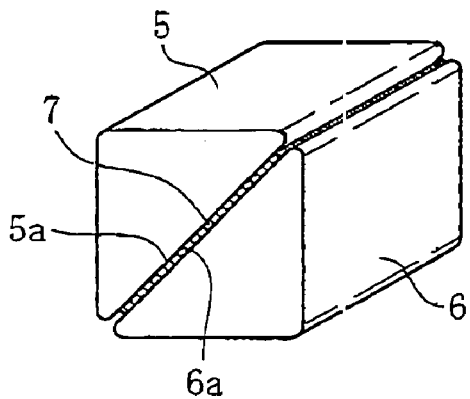

Referring to FIG. 1, a prism 1 according to the present invention, which is a right-angle prism in the shape of a right-angled isosceles triangle made of transparent optical glass, such as BK-7, comprises prism surfaces 1a, 1b, and 1c which are subjected to light such as an optical signal, and corner portions 1d, 1e, and 1f rounded in cross section which connect the prism surfaces 1a, 1b, and 1c to one another. The surfaces of the corner portions 1d, 1e, and 1f are fire-polished surfaces, and the Ra value of the surface roughness thereof is 30 nm. As shown in the same figure with enlargement, a compressive stress layer 2 having stress of approximately 3 MPa is formed on each of the surfaces of the corner portions 1d, 1e, and 1f. The structure described above physically strengthens the corner portions 1d, 1e, and 1f. The Ra value of the surface roughness of each of the prism surfaces 1a, 1b, and 1c is 30 nm, and the flatness thereof is better than a quarter of the wavelength λ of incident light, so that the prism surfaces are able to transmit or reflect light without scattering. The prism surfaces 1b and 1c form an angle θ1 of 90 degrees±15", and the prism surfaces 1a and 1b form an angle of θ2 of 45 degrees±15' with very high precision.

The prism 1 is a small-sized prism, a side of which is 0.5 mm and in which a diameter D of a circumscribed circle is 0.7 mm. A length L parallel to the prism surfaces 1a, 1b, and 1c is 2 mm, and the prism 1 takes a elongate shape so as to satisfy the relation of $L \geq 1.5D/2^{0.5}$.

According to the result of a three-point-bending test, the bending strength of the prism 1 is 120 MPa, which increases by approximately 2.5 times as compared with the same-sized conventional prism manufactured by polishing.

FIG. 1(B) shows a prism 3 according to another embodiment. A filter film 4 which transmit light with a wavelength of 1310 nm by equal to or more than 95%, and does not substantially transmit and totally reflects light with a wavelength of 1550 nm is formed on a prism surface 3a of the prism 3, and the prism 3 is used as, for example, an optical switch and the like.

FIG. 1(C) shows prisms 5 and 6 according to further another embodiment. A polarizing film 7 having the function of a beam splitter for processing P polarization and S polarization is formed between prism surfaces 5a and 6a opposed to each other, and the prisms 5 and 6 are used as, for example, an optical system for an optical head of an optical disk device.

Next, a producing method of the prism according to the present invention will be described.

Figure 2A:
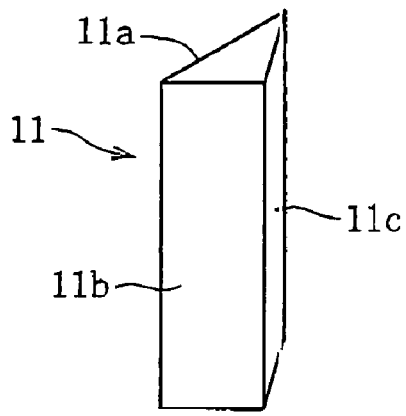
FIG. 2(A) is a perspective view of a glass base material.

Referring to FIG. 2(A), a glass base material 11, made of, for example, BK-7 being borosilicate optical glass, the minimum viscosity of which becomes $10^4$ Pa·s when temperature is approximately 850 deg C., has surfaces 11a, 11b, and 11c which become prism surfaces after forming. The glass base material 11 takes the shape of a right-angled isosceles triangle the base of which is the surface 11a in cross section, and the length of the side of the surfaces 11b and 11c is approximately 10 to 70 mm, and the surfaces 11b and 11c form an angle of 90 degrees±15'. The Ra value of the surface roughness of each of the surfaces 11a, 11b, and 11c, to be the prism surfaces of the prism after forming the glass base material 11, corresponds to #600 less than the Ra value corresponding to #170, which is about 2 μm, more specially, the Ra value of each of the surfaces 11a to 11c is 0.3 to 0.5 m, for example, about 0.44 μm.

Figure 2B:
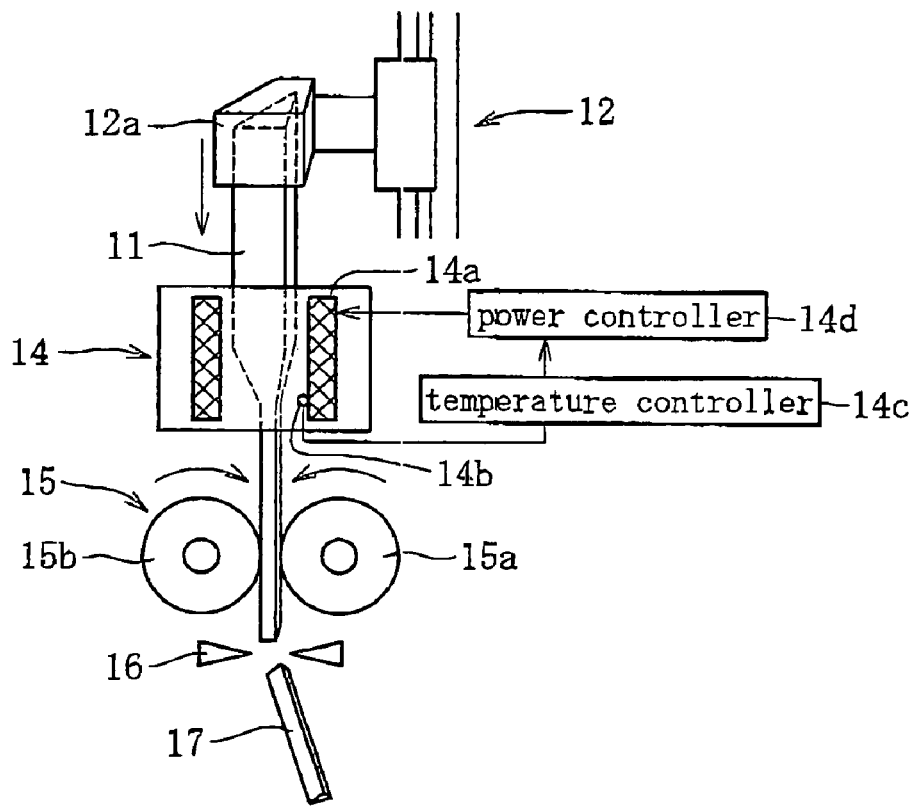
FIG. 2(B) is an explanatory view of a process for obtaining a longer body by drawing and forming the glass base material.

FIG. 2(B) shows an apparatus for drawing and forming the glass base material 11. The drawing and forming apparatus forms a longer body 17 which is substantially similar to the glass base material 11 in shape, and has a dimension in a desired range. This drawing and forming apparatus essentially comprises a feeding means 12 having a grasp portion 12a for grasping the glass base material 11, a heating furnace 14 for heating the glass base material 11 to a predetermined temperature in which the minimum viscosity thereof becomes equal to or more than $10^4$ Pa·s and less than $10^6$ Pa·s, a drawing means 15 having a pair of rollers 15a and 15b for drawing and forming the lower portion of the glass base material 11, and a cutting means is for cutting the drawn glass.

The heating furnace 14 is provided with a heater 14a for heating the glass base material 11 to a predetermined temperature in which the minimum viscosity thereof becomes equal to or more than $10^4$ Pa·s and less than $10^6$ Pa·s, a thermocouple 14b for measuring temperatures inside the furnace, and a power controller 14d which controls the output of the heater 14a with respect to a target temperature by means of inputting the electric signal of the thermocouple 14b to a temperature controller 14c. The power controller 14d makes the temperature stable in a predetermined range in which the minimum viscosity of the glass base material 11 becomes equal to or more than $10^4$ Pa·s and less than $10^6$ Pa·s.

An embodiment of the producing method of the prism according to the present invention will be described, wherein the prism 1 is manufactured out of the glass base material 11 with the use of the above drawing and forming apparatus.

First, as shown in FIG. 2(B), the glass base material 11, grasped by the grasp portion 12a of the feeding means 12, is fed into the heating furnace 14 at a constant speed. At this time, measuring the feeding speed of the glass base material 11 in drawing and forming, and operating the feeding means by inputting the signal of the feeding speed to a controller (not shown) make it possible to stably control the feeding speed of the glass base material 11 with high precision.

Then, the heating furnace 14 heats the glass base material 11 to approximately 800 deg C., at which the minimum viscosity thereof becomes $10^5$ Pa·s. Since the electric signal of the thermocouple 14b for measuring the temperature in the furnace is inputted to the temperature controller 14c, the power controller 14d operates to increase the output of the heater 14a when the temperature in the furnace measured by the thermocouple 14b is lower than a target temperature, approximately 800 deg C., and hence, the temperature in the heating furnace 14 is stably controlled so that the minimum viscosity or the glass base material 11 becomes $10^5$ Pa·s with precision. On the other hand, when the temperature in the furnace measured by the thermocouple 14b is higher than the target temperature, approximately 800 deg C., the power controller 14d operates to decrease the output of the heater 14a, and hence, the temperature in the heating furnace 14 is stably controlled so that the minimum viscosity of the glass base material 11 becomes $10^5$ Pa·s with precision.

Then, a glass portion, which is substantially solidified in a condition of being drawn downward from the glass base material 11 in the heating furnace 4 and being almost in predetermined dimension, is pinched and pressed by the pair of rollers 15a and 15b to make frictional force act enough, and then is drawn at a constant drawing speed which is several hundreds to several thousands times faster than the feeding speed of the glass base material 11. After that, the cutting means 16 cuts the drawn glass to obtain the longer body 17 the shape of which is substantially similar to the glass base material 11.

Figure 2C:
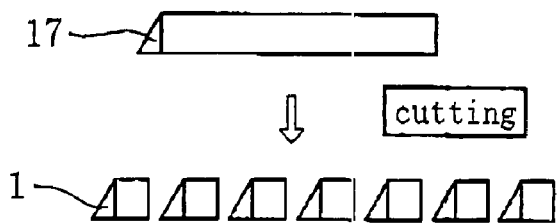
FIG. 2(C) is an explanatory view of a process for obtaining a plurality of prisms out of the longer body.

Then, as shown in FIG. 2(C), a precision cutting device cuts the precise longer body 17 so that, for example, the total length L thereof becomes 2 mm, to manufacture the prism 1. At this time, if a plurality of the longer bodies 17 arranged in 2-dimensional or 3-dimensional are cut at the same time, operating efficiency increases.

As described above, since the heated glass base material 11, made of optical glass, is drawn and formed with low viscosity, it becomes possible to stably form the longer body 17 with high precision, so that the prism 1 is manufactured in a few processes.

The prism is made of optical glass in the above embodiments, but may be made of ordinary glass for industrial use, or the like. When the prism needs heat resistance, transparent crystallized glass may be used.

The prism is a right-angle prism in the above embodiments, but the present invention is not limited thereto. The present invention is applicable to prisms in various shapes, such as a prism in the shape of a triangle with an acute angle or an obtuse angle, a prism in the shape of a quadrilateral including a trapezoid and a diamond, a prism in the shape of the other polygons, a prism in the special shape a part of which has a curve, and the like.

The invention claimed is:

1. A prism made of transparent glass comprising prism surfaces subjected to light, and corner portions between the prism surfaces,
    wherein surfaces of the corner portions are fire-polished surfaces, and
    wherein a compressive stress layer having stress of 0.1 to 10MPa is formed on the surface of the corner portion.

2. A prism according to claim 1, wherein a sectional area perpendicular to each of the prism surfaces is equal to or less than 100mm$^2$.

3. A prism according to claim 1, wherein the prism satisfies a relation of $L \geq 1.5D/2^{0.5}$, where D represents a diameter of a circumscribed circle of a section perpendicular to the prism surfaces, and L represents a length of the prism in a direction parallel to the prism surfaces.

4. A prism according to claim 1, wherein an optical film is formed on the prism surface.

5. A method for producing a prism, comprising the steps of:
    preparing a glass base material made of transparent glass, the glass base material having surfaces to be prism surfaces after forming, the Ra value of the surface roughness of the surface being less than the Ra value corresponding to #170, the glass base material having a dimensional ratio in a predetermined range with respect to the prism obtained after forming; grasping the glass base material with a grasp portion of feeding means, and feeding the glass base material into a heating furnace to heat the glass base material to a predetermined temperature so that a minimum viscosity of the glass base material becomes equal to or more than $10^4$ and less than $10^6$Pa·s,
    drawing and forming a lower portion of the glass base material by drawing means, and then cutting the glass base material into a predetermined length to obtain a longer body having a substantially similar shape to that of the glass base material and a dimension in a predetermined range, and having prism surfaces with the Ra value of the surface roughness equal to or less than a quarter of the wavelength of incident light; and
    cutting the longer body into predetermined length.

6. A method for producing a prism according to claim 5, wherein the prism surfaces of the longer body are polished.

7. A prism according to claim 2, wherein the prism satisfies a relation of $L \geq 1.5D/2^{0.5}$, where D represents a diameter of a circumscribed circle of a section perpendicular to the prism surfaces, and L represents a length of the prism in a direction parallel to the prism surfaces.

8. A prism according to claim 2, wherein an optical film is formed on the prism surface.

9. A prism according to claim 3, wherein an optical film is formed on the prism surface.

* * * * *